United States Patent [19]

Clark et al.

[11] Patent Number: 5,087,596
[45] Date of Patent: Feb. 11, 1992

[54] PROCESS FOR REGENERATING SPENT HEAVY HYDROCARBON HYDROPROCESSING CATALYST

[75] Inventors: Frederick T. Clark, Wheaton, Ill.; Albert L. Hensley, Jr., Munster, Ind.

[73] Assignee: Amoco Corporation, Chicago, Ill.

[21] Appl. No.: 541,616

[22] Filed: Jun. 21, 1990

[51] Int. Cl.⁵ .................. B01J 23/94; B01J 38/64; C10G 45/08
[52] U.S. Cl. .................. 502/49; 208/216 PP; 208/251 H; 208/254 H; 502/25; 502/26; 502/22
[58] Field of Search .............. 502/25, 22, 49.26, 521, 502/517

[56] References Cited

U.S. PATENT DOCUMENTS

| 3,259,588 | 7/1966 | Harvey et al. | 502/25 |
| 4,485,183 | 11/1984 | Miller et al. | 502/517 |
| 4,549,957 | 10/1985 | Hensley, Jr. et al. | 208/251 H |

FOREIGN PATENT DOCUMENTS

| 68890 | 6/1977 | Japan | 502/25 |
| 825136 | 4/1981 | U.S.S.R. | 502/25 |

Primary Examiner—Paul E. Konopka
Attorney, Agent, or Firm—Ekkehard Schoettle; William H. Magidson; Ralph C. Medhurst

[57] ABSTRACT

The present invention relates to a spent hydroprocessing catalyst regeneration process wherein the catalyst is subjected to an initial partial decoking step, followed by impregnation with a Group VIB metal-containing component, and then subjected to a final decoking step.

9 Claims, 2 Drawing Sheets

PROCESS FOR REGENERATING SPENT HEAVY HYDROCARBON HYDROPROCESSING CATALYST

BACKGROUND OF THE INVENTION

The United States and Canada generate about 100,000,000 pounds of spent base-metal catalyst per year, about half of which is spent hydroprocessing catalysts. The present invention relates to a process for regenerating spent heavy hydrocarbon hydroprocessing catalysts. More specifically, the present invention relates to a process for regenerating spent heavy hydrocarbon hydroprocessing catalysts that have been deactivated with coke and metal deactivants such as nickel and vanadium.

With respect to the present invention, the term hydroprocessing is used to refer to a process for hydrodemetallation, hydrodesulfurization, hydrodenitrogenation, and hydroconversion wherein the term hydroconversion encompasses the hydrocracking and hydrotreating of hydrocarbon streams containing asphaltenes and contaminant metals. Hydroprocessing catalysts used to treat heavy hydrocarbon streams, such as resids, are deactivated as a result of metals deposition and coke deposition. These deposition materials modify the rate of reaction as well as accelerate the rate of catalyst deactivation. The various metal deposits tend to occlude catalyst pores and poison the hydroprocessing catalyst, while coke deposits similarly reduce pore size and surface area of the hydroprocessing catalyst.

Typically, hydroprocessing catalysts possess substantial macropore volume in order to effect metals removal from the heavy hydrocarbon feed streams. Heavy hydrocarbon hydroprocessing catalysts possess the capacity to adsorb contaminant metals, such as nickel and vanadium, in an amount ranging up to about 100 wt.% of the fresh catalyst weight. However, due to the rapid coke deposition rate, the catalyst is deactivated prior to achieving its full metals adsorption capacity. Such catalysts are taken out of service when they contain as little as 10 wt.% nickel plus vanadium. If the spent catalyst is not regenerated, it is subsequently sent to a metals reclamation facility where the proceeds therefrom, in part, depend upon the vanadium content of the spent catalyst.

Thus, the prior art is replete with processes suitable for regenerating or rejuvenating such hydroprocessing catalysts. In general, these processes involve removing the deposited contaminant metals, preceded or followed by a coke burn-off step. The metals can be removed first, for example, by acid-leaching with oxalic acid or sulfuric acid, followed by the decoking step. While some processes afford the extraction of nickel and vanadium without removing active metals [U.S. Pat. No. 4,677,085 (Nevitt)], catalytic metals such as cobalt and molybdenum may have to be reimpregnated (Silbernagel, B. G., R. R. Mohan, and G. H. Singhal, "NMR Studies of Metal Deposition on Hydroprocessing Catalysts and Removal with Heteropolyacids," ACS Div. Ind. Eng. Chem. Catal. Mater. Relationship Struct. Reactivity Symposium (San Francisco 6/13-16/83) ACS Symp. Ser. 248, 91 (1984)).

In the fluidized catalytic cracking (FCC) art, feedstocks containing vanadium are handled by the use of passivation agents. For instance, U.S. Pat. No. 4,451,355 (Mitchell et al.) discloses the use of calcium, antimony, tin, barium, manganese, and bismuth additives to mitigate the poisonous effects of nickel, vanadium and iron contained in FCC feedstocks. U.S. Pat. No. 4,364,847 (Tu) discloses the use of lithium to carry out the subject pacification.

Similarly, U.S. Pat. No. 4,549,958 (Beck et al.) discloses treatment of hydrocarbon oil having a significant content of vanadium. A fluidizable sorbent is used to demetallize and decarbonize the hydrocarbon oil. The sorbent contains additive metal components in an amount sufficient to complex with and immobilize the flow characteristics of sodium vanadates or vanadium pentoxide formed during the sorbent oxidative regeneration step. These additive metals are selected from the group consisting of Mg, Ca, Ba, Sc, Y, La, Ti, Zr, Hf, B, Ta, Mn, In, Te, an element in the lanthanide or actinide series, or an organo-metallic compound of the additive metal component.

As mentioned above, the metals, especially vanadium, tend to deactivate hydroprocessing catalysts; however, these metals also tend to affect the catalyst's physical properties, such as the crush strength and the attrition rate of a regenerated hydroprocessing catalyst. Further, most regeneration processes achieve only partial or mixed restoration of fresh activities regardless of whether the contaminant metals are removed. In this connection, the paper "Studies of Poisoning and Regeneration of Hydrodesulfurization and Hydrodemetallization Catalyst during Treatment of Venezuelan Crude Oils" J. Japan Petrol. Inst. 22,(4), 234–242 (1979) shows that where catalysts have been used in hydrodesulfurization (HDS) and hydrodenitrogenation (HDN) processes to treat Venezuelan feeds, the activity loss could only be regenerated by about 70 to 90 percent because vanadium deposits modified the activity strongly by blocking catalyst pores and active centers.

In ACS Div. of Petroleum Preprints Vol.27 No.3 679-81 (Sept. 1982), a process is disclosed wherein a commercial Al-Co-Mo catalyst is regenerated using a solvent-extraction treatment to extract contaminant metals with organic reagents capable of forming water-soluble metal complexes. The extraction step was followed by a coke burning step. The regenerated catalyst possessed a lower hydrodesulfurization activity yet a higher hydrodevanadization activity.

U.S. Pat. No. 4,795,726 (Schaper et al.) discloses a method for regenerating spent alumina-based catalysts that have been employed in treating metals-contaminated hydrocarbon feedstocks. The subject process involves a steam treatment step, coke burn-off step, and a basic medium treatment step. The process may require the addition of catalytic metals to the regenerated catalyst since the catalytic metals are removed together with the vanadium and nickel.

In a paper, Ernst W. R., et al. "GTRC Process For Removing Inorganic Impurities From Spent Hydrodesulfurization Catalysts" Minerals and Metallurgical Processing, 4 (2), 78 (1987), a method is disclosed for removing nickel and vanadium contaminants from spent hydrodesulfurization catalysts that involves pretreating the catalyst with $H_2S$ followed by the extraction of nickel and vanadium with an acidic solution of ferric ion. The subject method results in the removal of some catalytic metals, such as 50 percent of the cobalt and 5 percent of the molybdenum. The regenerated catalyst possessed hydrodesulfurization (HDS) and hydrodenitrogenation (HDN) activities of about 70 percent of the fresh catalyst activities, while the deactivation rates, for HDS but not HDN of the regenerated catalyst were superior to those of the fresh. The regenerated catalyst possessed superior hydrodemetallation activity.

Various additives or reagents have been employed to assist in the regeneration of hydroprocessing or hydrorefining catalysts. For instance, U.S. Pat. No. 4,581,129 (Miller et al.) discloses a process for regenerating a hydrorefining catalyst which results in restoration of catalytic activity, no loss in the strength of the support material, and no unacceptable loss of active metals. The subject patent discloses an embodiment of the invention wherein a mild heat treatment or a partial decoking step is preceded or immediately followed by an extraction of the vanadium and nickel metal contaminants with an acidic solution. A preferred metals-extraction method is disclosed in U.S. Pat. No. 4,089,806 (Farrell et al.) wherein oxalic acid or in one or more water-soluble, nitrate-containing compounds, such as nitric acid, and water-soluble inorganic nitric salts are used. The subject regeneration process involves incorporating a phosphorous component after the partial decoking and extraction step prior to combusting essentially the remainder of the coke from the catalyst.

The subject patent offers the explanation that carrying out the decoking in the absence of phosphorous by combustion releases $SO_2$ from the sulfur on the catalyst, which $SO_2$, in the presence of $O_2$, and the large quantities of vanadium contaminants on the catalyst, are partially converted to $SO_3$. During combustion, the $SO_3$ reacts with the alumina component of the hydrorefining catalyst to form aluminum sulfate, and, as a result, the crushing strength, pore volume, surface area, and activity of the catalyst are often reduced. The subject patent further explains that vanadium on the deactivated catalyst is initially in the $+3$ or $+4$ oxidation state in such forms as $V_2S_3$ or $VS_2$. Thus, when a sufficient temperature threshold is surpassed, the vanadium is converted to the $+5$ oxidation state suitable for promoting the $SO_2$ conversion to $SO_3$. Incorporation of phosphorous components with the deactivated catalyst is thought to passivate or inhibit, by some chemical reaction mechanism, the vanadium conversion to the $+5$ oxidation state and thereby inhibit the sulfation mechanism.

The Patentees also point that their metals-extraction process may result in a reduction of $MoO_3$ and $CoO$ catalytic components, e.g., from 12 and 4 wt.% to 8 and 3 wt.%, respectively. Thus, Patentees suggest in a highly preferred embodiment of their invention, that catalytic components be reintroduced to the rejuvenated catalyst. Patentees also suggest that the rejuvenated catalyst be crushed and reformulated into particulate form by extruding a mixture of a gel and the crushed rejuvenated catalyst.

U.S. Pat. No. 4,089,806 (Farrell et al.) as mentioned above also discloses a process for removing vanadium and nickel deactivants from contaminated hydrodesulfurization catalysts comprising Group VIB and/or Group VIII active components on refractory oxide supports. In this process, the spent catalyst is contacted with an aqueous regenerant solution comprising oxalic acid and one or more soluble nitrate-containing compounds from the class consisting of nitric acid and water-soluble inorganic nitrate salts. Suitable nitrate salts include sodium nitrate, ammonium nitrate, potassium nitrate, calcium nitrate, magnesium nitrate, copper nitrate, etc., with the preferred salt being aluminum nitrate. This contacting results in the removal of vanadium and nickel contaminants from the surface of the deactivated catalyst and substantially rejuvenates the catalyst for hydrodesulfurization purposes, provided that such removal is accomplished prior to the burning off of any coke present in the catalyst.

The patent further maintains that subsequent decoking after the contacting treatment with the regeneration solution is optional. Sufficient activity is restored by the method described without decoking being necessary. Patentees maintain that decoking of heavily deactivated catalyst may actually result in a loss of some of the activity restored by the treatment with the regenerant solution. Patentees further maintain that it is a critical aspect of the invention that the deactivated catalyst should not be decoked prior to treatment with regenerant solution, primarily because such decoking is generally counterproductive. Decoking by combustion prior to the treatment described herein releases $SO_2$ from the sulfur in the coke which, in the presence of $O_2$ and large quantities of vanadium, deactivates the catalyst. The so-produced $SO_3$ then reacts with the alumina catalyst support to form aluminum sulfate, thereby lowering the crush strength.

Farrell et al. maintain that the rejuvenated catalyst will have at least 30 percent, usually 70 percent and an occasion over 80 percent of the fresh original activity. Patentees explain that full restoration is generally not possible since 10 percent or less of the active catalytic components are removed from the catalyst during the regeneration process.

U.S. Pat. No. 4,268,415 (Mohan et al.) discloses a process for the regeneration of spent hydrodesulfurization catalysts with heteropoly acids and hydrogen peroxide. In particular, the patent discloses a process wherein a spent hydrofining catalyst is regenerated by contacting the spent catalyst with a solution of a heteropoly acid having the general formula of $H_x(YM_{12}O_{40})$ where Y is at least one element selected from the group consisting of phosphorus, silicon, titanium, germanium, arsenic, zirconium, thorium and cerium, M is at least one element selected from the group consisting of molybdenum, tungsten, niobium and tantalum and x is 3 when Y is pentavalent (P, As) and x is 4 when Y is tetravalent (Si, Ti, Ge, Zr, Ce, Th). The heteroploy acid solution preferably contains 1 to 50 wt.% hydrogen peroxide. Patentees maintain that the method results in the extraction of about 70 to 100% vanadium and about 90% nickel and about 50% cobalt with essentially no loss of molybdenum and aluminum coupled with the preservation of the structural integrity of the catalyst support. The spent catalyst regeneration process can also further include additional processing by doping the demetallized catalyst with cobalt followed by calcination. The subject cobalt impregnation improves or promotes carbon decoking, further sulfur removal, and an additional increase in surface area and pore volume. Patentees maintain that hydrorefining activity and product selectivity of the regenerated spent catalyst is substantially the same as that of the fresh catalyst.

U.S. Pat. No. 4,728,417 (Aldag, Jr. et al.) discloses a process wherein an additive comprising a mixture of at least one decomposable molybdenum compound selected from the group consisting of molybedenum dithiophosphates and molybdenum dithiocarbamates and at least one decomposable nickel compound selected from the group consisting of nickel dithiophosphates and nickel dithiocarbamates is mixed with the hydrocarbon feed. The hydrocarbon feed containing the additive is then contacted with the hydrofining catalyst. The additive can be added when the catalyst is new, partially deactivated or spent with a beneficial result occurring in each case. Patentees maintain that the introduction of the additives slows down the catalyst rate of decline from the time of introduction and in some cases improves at least a partially spent or deactivated catalyst from the time of introduction.

Accordingly, the prior art presents a dilemma in that contaminant metals must be removed to retain or restore physical and catalytic properties of the spent hydroprocessing catalyst, yet its reclamation value is diminished when the metal, i.e., vanadium, content of the spent catalyst is reduced. Thus, there is a need for a catalyst regeneration process wherein the catalyst poisoning contaminant metals, such as vanadium, need not be removed such that the demetallization capacity of the hydroprocessing catalyst is entirely utilized thereby increasing its eventual reclamation value. Further, there is a need for a regeneration process that restores all catalytic activities without the need to reimpregnate catalytic metals while concomitantly maintaining requisite physical properties such as attrition resistance, attrition resistance being an especially important property when the catalyst is employed in an ebullated bed reactor system.

It has now been discovered that when a Group VIB metal component is incorporated into the spent catalyst in accordance with the present invention, catalyst activities can be restored with no need for removal of contaminant metals coupled with no loss in catalyst attrition resistance.

SUMMARY OF THE INVENTION

The present invention relates to a process for regenerating a spent heavy hydrocarbon hydroprocessing catalyst. Specifically, the process includes the steps of carrying out an initial partial decoking step wherein the spent catalyst is contacted with an oxygen-containing gas at about 400° F. to about 700° F. At least one Group VIB metal is then incorporated with the partially decoked catalyst in an amount such that the partially decoked catalyst contains about 0.1 to about 20.0 wt.% of the Group VIB metal calculated as the oxide. The impregnated catalyst is then subjected to another final decoking step in the presence of an oxygen-containing gas at about 600° F. to about 1,400° F.

DETAILED DESCRIPTION OF THE INVENTION

Figure 1:
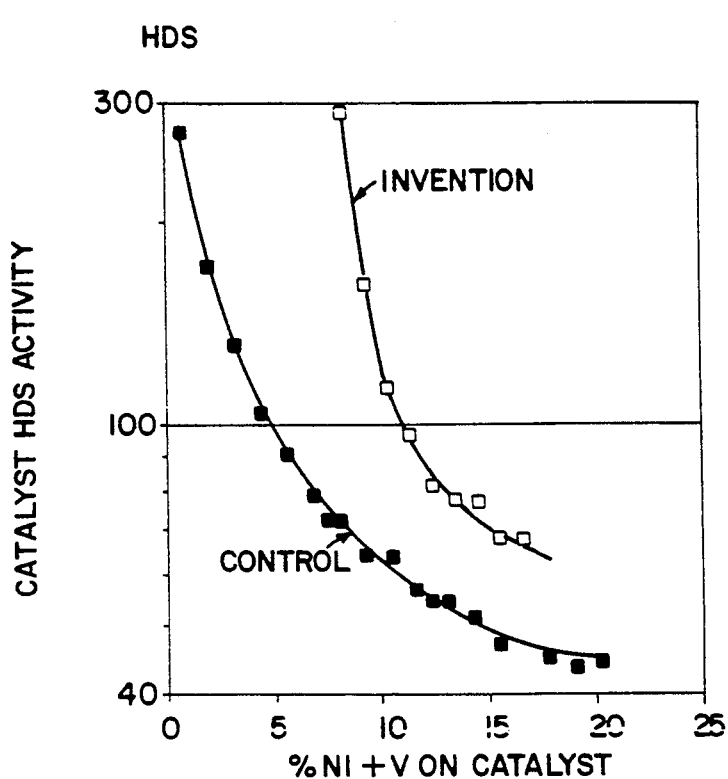
FIGS. 1 through 4 depict plots of hydrodesulfurization activity, hydrodenitrogenation removal activity, Ramscarbon removal activity, and devanadation activity, respectively, versus weight percentage accumulation of nickel plus vanadium for both comparative and invention catalysts tested in the Example 1.

Broadly, the present invention is directed to the regeneration of catalysts used in a process for the hydroprocessing of heavy hydrocarbon feedstocks which contain asphaltenes, Shell hot filtration solids precursors, metals, nitrogen compounds, and sulfur compounds. As is well known, these feedstocks contain nickel, vanadium, and asphaltenes, e.g., about 40 ppm up to more than 1,000 ppm for the combined total amount of nickel and vanadium and up to about 25 wt.% asphaltenes. These catalysts have been used in processes that treat feedstocks with a substantial amount of metals containing 150 ppm or more of nickel and vanadium and having a sulfur content in the range of about 1 wt.% to about 10 wt.%. These catalysts have been used to treat feedstocks that contain a substantial amount of components that boil appreciably above 1,000° F. Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organo-metallic contaminants which create deleterious effects in various refining processes that employ catalysts in the conversion of the particular hydrocarbon stream being treated. The metallic contaminants found in such feedstocks include, but are not limited to, iron, vanadium, and nickel.

Nickel is present in the form of soluble organo-metallic compounds in most crude oils and residuum fractions. The presence of nickel porphyrin complexes and other organo-nickel complexes causes severe difficulties in the refining and utilization of heavy hydrocarbon fractions, even if the concentration of such complexes is relatively small. It is known that a cracking catalyst deteriorates rapidly and that its selectivity changes when in the presence of an appreciable quantity of the organo-nickel compounds. An appreciable quantity of such organo-nickel compounds in feedstocks that are being hydrotreated or hydrocracked harmfully affects such processes. The catalyst becomes deactivated, and plugging or increasing of the pressure drop in a fixed-bed reactor results from the deposition of nickel compounds in the interstices between catalyst particles.

Iron-containing compounds and vanadium-containing compounds are present in practically all crude oils that are associated with the high Conradson carbon asphaltenic and/or asphaltenic portion of the crude. Of course, such metals are concentrated in the residual bottoms when a crude is topped to remove those fractions that boil below about 450° F. to 600° F. If such residuum is treated by additional processes, such as fluidized catalytic cracking, the presence of such metals as well as sulfur and nitrogen adversely affects the catalysts in such processes. It should be pointed out that the nickel-containing compounds deleteriously affect cracking catalysts to a greater extent than do iron-containing compounds. If an oil containing such metals is used as a fuel, the metals will cause poor fuel oil performance in industrial furnaces since they corrode the metal surfaces of the furnaces.

While metallic contaminants, such as vanadium, nickel, and iron, are often present in various hydrocarbon streams, other metals are also present in a particular hydrocarbon stream. Such metals exist as the oxides or sulfides of the particular metal, or as a soluble salt of the particular metal, or as high molecular weight organo-metallic compounds, including metal naphthenates and metal porphyrins and derivatives thereof.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature replacement.

Although processes for the hydroprocessing of heavy hydrocarbon streams, including but not limited to heavy crudes, reduced crudes, and petroleum hydrocarbon residua, are known, the use of fixed-bed catalytic processes to convert such feedstocks without appreciable asphaltene precipitation and reactor plugging and with effective removal of metals and other contaminants, such as sulfur compounds and nitrogen compounds, is not common because the catalysts employed have not generally been capable of maintaining activity and performance.

Thus, the subject hydroprocessing processes are most effectively carried out in an ebullated bed system. In an ebullated bed, preheated hydrogen and resid enter the bottom of a reactor wherein the upward flow of resid plus an internal recycle suspend the catalyst particles in the liquid phase. Recent developments involved the use of a powdered catalyst which can be suspended without the need for a liquid recycle. In this system, part of the catalyst is continuously or intermittently removed in a series of cyclones and fresh catalyst is added to maintain activity. Roughly about 1 wt.% of the catalyst inventory is replaced each day in an ebullated bed system. Thus, the overall system activity is the weighted average activity of catalyst varying from fresh to very old, i.e., deactivated.

Typically, the subject hydroprocessing process is carried out in a series of ebullated bed reactors. As previously elucidated, an ebullated bed is one in which the solid catalyst particles are kept in random motion by the upward flow of liquid and gas. This random motion makes the attrition resistance of the catalyst a very important property. Attrition resistance is also an important property with respect to catalysts employed in a fixed bed reactor, because the catalyst must maintain its physical integrity, i.e., resist attrition, while it is being loaded into a reactor.

In any event, an ebullated bed typically has a gross volume of at least 10 percent greater and up to 70 percent greater than the solids thereof in a settled state. The required ebullation of the catalyst particles is maintained by introducing the liquid feed, inclusive of recycle, if any, to the reaction zone at linear velocities ranging from about 0.02 to about 0.4 feet per second and preferably, from about 0.05 to about 0.20 feet per second.

The catalyst that is regenerated in accordance with the present invention preferably contains a hydrogenation component, a porous inorganic oxide support and is free from a molecular sieve component.

Preferred hydrogenation components are selected from the group consisting of Group VIB metals and Group VIII metals. The addition of a Group VIII metal to the catalyst is especially useful when ebullated bed reactors are employed. In a fixed-bed reactor the activity of the catalyst dissipates over time, whereas in the ebullated bed reactor, since fresh amounts of catalyst are continuously or intermittently added, the Group VIII metal provides increased overall average activity since the presence of a Group VIII promoter provides a higher initial activity than the catalyst not containing such a promoter. The freshly added higher, initial activity catalyst is included in the weighted average used to determine overall average activity. It has been discovered that relatively small amounts of cobalt present in a hydroprocessing catalyst provide excellent hydroprocessing activity in an ebullated bed system. This low cobalt-containing hydroprocessing catalyst is disclosed and claimed in U.S. Pat. No. No. 4,657,665 (Beaton et al.). This low cobalt-containing catalyst also has a Group VIB metal present in an amount ranging from about 3.5 to about 5.0 wt.% calculated as an oxide and based on total catalyst weight. The cobalt is present in an amount ranging from about 0.4 to about 0.8 wt.% calculated as an oxide (CoO) and based on total catalyst weight.

In any event, the hydrogenation metals can be deposed on a porous inorganic oxide support such as alumina, aluminum phosphate, or aluminum silicates. Suitably, the composition of the hydroprocessing catalyst of the present invention comprises from about 3.0 to about 15.0 wt.% of the Group VIB metal, calculated as the oxide. Preferably, the Group VIB metal is molybdenum. The Group VIB and Group VIII classifications of the Periodic Table of Elements can be found on page 628 of Webster's Seventh New Collegiate Dictionary, G. & C. Merriam Company, Springfield, Mass., U.S.A. (1965). While calculated as the oxide, the hydrogenation metal components of the catalyst can be present as the element, as an oxide thereof, as a sulfide thereof, or mixtures thereof. Molybdenum, which is generally superior to chromium and tungsten in demetallation and desulfurization activity as mentioned above, is the preferred Group VIB metal component in the demetallation catalyst.

The Group VIII metal can be present in an amount ranging from about 0.4 to about 4.0 wt.% calculated as an oxide and based on total catalyst weight. The preferred Group VIII metals are cobalt and nickel. The cobalt and nickel are preferably present in an amount such that the CoO or NiO to Group VIB metal oxide weight ratio varies from about 0.2 to about 0.3.

The hydroprocessing catalyst regenerated in accordance with the process of the present invention can be prepared by the typical commercial method of impregnating a large-pore, high-surface area, inorganic oxide support or any other method known to those skilled in the art. Appropriate commercially available alumina, preferably calcined at about 800°–1,600° F. (426°–872° C.), for about 0.5 to about 10 hours, can be impregnated to provide a suitable surface area ranging from about 75 m$^2$/g to about 400 m$^2$/g and a total pore volume within the range of about 0.5 cc/g to about 1.5 cc/g.

Preferably, the surface area ranges from about 150 m$^2$/g to about 350 m$^2$/g, a total pore volume of about 0.8 cc/g to about 1.2 cc/g. The catalysts most suitably regenerated in accordance with the present invention contain pore volume of pores having a diameter greater than 1,200 Angstroms of at least 0.05 cc/g, preferably at least 0.1 cc/g, and optimally from about 0.15 to about 0.3 cc/g.

The porous refractory inorganic oxide, e.g., alumina can be impregnated with a solution, usually aqueous, containing a heat-decomposable compound of the metal to be placed on the catalyst, drying, and calcining the impregnated material. If the impregnation is to be performed with more than one solution, it is understood that the metals may be applied in any order. The drying can be conducted in air at a temperature of about 80° F. (27° C.) to about 350° F. (177° C.) for a period of 0.1 to 5.0 hours. Typically, the calcination can be carried out at a temperature of about 800° F. (426° C.) to about 1,200° F. (648° C.) for a period of from 0.5 to 16 hours.

Alternatively, the inorganic oxide support can be prepared by mixing a sol, hydrosol, or hydrogel of the inorganic oxide with a gelling medium, such as ammonium hydroxide followed by constant stirring to produce a gel which is subsequently dried, pelleted, or extruded, and calcined. The hydrogenation metal(s) can then be incorporated into the support as described above or incorporated during the gelling step.

While the hydroprocessing catalyst regenerated in accordance with the present invention can be present in the form of pellets, spheres, or extrudates, other shapes are also contemplated, such as a clover-leaf shape, cross-shape, or C-shape as disclosed in U.S. Pat. Nos. 3,674,680 and 3,764,565 (Hoekstra, et al.).

As mentioned above, during use of the above-described catalysts, their effectiveness is diminished because hydrocarbon residues in the form of coke and contaminant metals such as nickel and vanadium deposit and build up on catalyst surfaces and within catalyst pores. The term "contaminant metals" is used to designate metals incidentally composited with the catalyst. In some cases residues of the same metal which is used as a catalytic metal deposit incidentally as a contaminant metal on the catalyst. Nickel is an example of a metal which may be both a catalytic metal and a contaminant metal. In this case the metal intentionally put on the catalyst as a catalytic metal remains "catalytic metal," and the same-metal residue incidentally deposited during use of the catalyst becomes a "contaminant metal."

In any event, coke and contaminant metals build-up reduces catalyst activity and selectivity, thereby resulting in deactivated, or spent catalyst. Catalyst activity is a measure of the catalyst's ability to assist the conversion of reactants into products at a specified severity level, where severity level means the reaction conditions used, that is the temperature, pressure, contact time, and presence of diluents, if any. Catalyst selectivity is a measure of the catalyst's ability to help produce a high amount of desired products relative to the amount of reactants charged or converted.

The spent heavy hydroprocessing catalyst suitable for use in the present regeneration invention usually contains a total contaminant metals build-up of greater than about 4 wt.% nickel plus vanadium based on fresh catalyst weight. The carbonaceous or coke build-up ranges from about 20 to about 60 wt.% based on total fresh catalyst weight. The relative amounts of metals and coke present in deactivated catalysts is dependent upon the relative upstream or downstream position of the catalyst in the reactor while it is in use. The upstream catalyst would contain more metals while the downstream catalyst would contain more coke.

Prior to carrying out the process of the invention, the catalyst may be optionally washed with an organic solvent such as toluene or stripped with an inert gas to remove surface oils.

In accordance with the process of the present invention spent heavy hydroprocessing catalyst is initially subjected to a partial decoking or oxidation step wherein the catalyst is contacted with an oxygen-containing gas at about 400° F. to about 700° F. This partial decoking step is carried out until up to about 70 weight percent of the deposited carbonaceous material is removed. The theory behind this partial decoking step which is not a limitation on the present invention is that the macropores are sufficiently opened by coke burn-off without oxidizing the vanadium contaminants. The preferred gas comprises air and recycled combustion gases.

Subsequent to the initial decoking step at least one Group VIB metal is incorporated with the partially decoked spent catalyst.

The Group VIB metal(s) can be incorporated into the partially decoked spent catalyst by any method known to those skilled in the art. Typically, the partially decoked spent catalyst can be impregnated to incipient wetness with an aqueous, or organic solution or dispersion of a or compounds of the Group VIB metal(s).

Preferably, nitrates, carbonates and salts of organic acids, such as acetates are employed in the impregnating solution or dispersion. The impregnation solution should contain a sufficient amount of Group VIB metal(s) such that the impregnated spent catalyst contains from about 0.1 to about 20 wt.% of the Group VIB metal(s) calculated as the oxide(s) and based on fresh catalyst weight.

Preferably, the impregnating solution contains a sufficient amount of Group VIB metal(s) to result in an impregnated spent catalyst containing 0.5 to 10.0 wt.% Group VIB metal calculated as the oxide(s) and based on fresh catalyst weight. Most preferably or optimally the subject catalyst contains from about 1.0 to 5.0 wt.% Group VIB metal(s) on the above-described basis.

The preferred Group VIB metal is molybdenum. As mentioned, in part, above, the Group VIB metal(s) can be impregnated with aqueous impregnating solutions that contain the Group VIB metal(s) as the salt(s) of a nitrate, a sulfate, a sulfite, an acetate, a benzoate, a halide, a carbonate, an oxy-halide, a hydroxide, an oxalate and a thiosulfates. The impregnation can also be performed using organic solvents (alcohols, ketones and esters) containing the above-mentioned compounds.

While not wishing to be bound by theory, it is speculated that the catalyst-softening or high attrition rate that occurs after conventional regeneration processes can be attributed to the following mechanism.

When hydroprocessing catalysts are subjected to a combustion step in air under conditions to remove coke, i.e., 900° to 1000° F., one of the species oxidized is the $V_3S_4$ sulfide, the predominant vanadium phase deposited under typical heavy hydrocarbon hydroprocessing conditions. The sulfide is then converted to an equilibrium mixture consisting of the $V_2O_5$ pentoxide (pentavalent vanadium) as well as sub-oxides and oxy-sulfates (tetra-valent vanadium and lower).

Water formed during the combustion step reacts with the pentoxide to form vanadic acid, $VO(OH)_3$, a volatile and highly reactive species that reacts with metals present in the catalyst such as, iron, nickel, aluminum or molybdenum to form mixed metal vanadates. These vanadates cause loss of both catalyst surface area and attrition resistance. This process is accelerated as the temperature approaches the relatively low melting point of the $V_2O_5$ pentoxide, which is 1250° F.

Sulfation of the alumina support by sulfur trioxide formed during the coke-burn has also been proposed as a mechanism leading to catalyst-softening during regeneration. Vanadium pentoxide, an active oxidation catalyst, is formed during regeneration and could catalyze the formation of sulfur trioxide from the dioxide, enhancing the alumina sulfation process.

In any event, it is postulated that when a Group VIB metal is added to the catalyst in accordance with the present invention, prior to the final coke-combustion step the Group VIB metal immobilizes vanadium pentoxide formed during regeneration. This does two beneficial things:

1. It reduces the activity of $V_2O_5$ as an $SO_2$-oxidation catalyst, thus preventing formation of aluminum sulfate.

2. It limits the ability of $V_2O_5$ to flux on the catalyst surface at high decoking temperatures, thus preserving catalyst pore structure.

The above-impregnated spent catalyst is then subjected to another final decoking or oxidation step wherein the catalyst is contacted with an oxygen-containing gas as in the initial coke-burning step at about 600° F. to about 1,400° F. Preferably, the upper temperature limit is about 1200° F. and most preferably, the upper temperature limit is about 1000° F. This step is carried out until about 95 percent or more of the coke is removed from the catalyst.

The regenerated catalyst can then be placed back in service in a hydroprocessing process as described above. Preferably, the catalyst is introduced into the most upstream portion of a series of ebullated bed reactors.

The operating conditions for the hydroprocessing of heavy hydrocarbon streams, such as petroleum hydrocarbon residua and the like, comprise a hydrogen partial pressure within the range of about 1,000 psia (68 atm) to about 3,000 psia (204 atm), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 m³/m³) to about 15,000 SCFB (2,671 m³/m³). Preferably, the operating conditions comprise a hydrogen partial pressure within the range of about 1,200 psia to about 2,800 psia (81-190 atm); an average catalyst bed temperature within the range of about 730° F. (387° C.) to about 820° F. (437° C.); and a LHSV within the range of about 0.15 to about 2; and a hydrogen recycle rate or hydrogen addition rate within the range of about 2,500 SCFB (445 m³/m³) to about 10,000 SCFB (890 m³/m³).

If the regenerated catalyst of the present invention were to be used to treat hydrocarbon distillates, the operating conditions would comprise a hydrogen partial pressure within the range of about 200 psia (13 atm) to about 3,000 psia (204 atm); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 m³/m³) to about 10,000 SCFB (1,381 m³/m³). Preferred operating conditions for the hydroprocessing of hydrocarbon distillates comprise a hydrogen partial pressure within the range of about 200 psia (13 atmos) to about 1,200 psia (81 atmos); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m³/m³) to about 6,000 SCFB (1,068 m³/m³). Generally, the process temperatures and space velocities are selected so that at least 30 vol.% of the feed fraction boiling above 1,000° F. is converted to a product boiling below 1,000° F. and more preferably so that at least 60 vol.% of the subject fraction is converted to a product boiling below 1,000° F.

The present invention is described in further detail in connection with the following examples, it being understood that the same are for purposes of illustration and not limitation.

EXAMPLE 1

In the present example several tests were carried out to show the improvements afforded by the invention hydroprocessing catalyst regeneration process. These improvements included a restoration of initial catalyst activity as explained below and the achievement of an acceptable catalyst attrition rate.

In the present example, a fresh resid hydrodemetallation (HDM) hydroprocessing catalyst was compared with an invention regenerated hydrodesulfurization (HDS) catalyst. The fresh resid HDM catalyst is a commercially available catalyst that is typically or preferably used in the first stage of a two-stage resid hydrotreating unit, or in a more upsteam region of a resid hydrotreating unit. The catalyst employed in the relative upstream region should possess relatively higher hydrodemetallation and Ramscarbon removal activities since the rate of hydrodenitrogenation and hydrodesulfurization increases further downstream in the reactor. Thus, at a. minimal, any catalyst regenerated by the process of the invention should possess the demetallation and Ramscarbon removal activities of a fresh HDM catalyst used in the more upstream portion of the reactor, especially since regenerated catalyst will generally be introduced into the upstream portion of the reactor. The properties of the fresh HDM control catalyst, denoted as catalyst "A", are set out below in Table I.

The invention regenerated HDS catalyst was obtained by regenerating a spent commercial resid hydroprocessing catalyst that had been removed from the downstream bed of a commercial resid hydroprocessing unit. Prior to contact with feedstock at reaction conditions, the fresh HDS catalyst, denoted as catalyst "B", had properties as set out below in Table I. Prior to regeneration, the spent HDS catalyst, denoted as catalyst "C" with the properties set out below in Table I, was washed with toluene and hexane to strip off excess oil and dried overnight in a nitrogen-purged convection oven at 250° F.

The invention regenerated HDS catalyst, denoted as catalyst "D" with the properties set out below in Table I, was obtained by carrying out the regeneration process in accordance with the present invention. The above-described spent catalyst was first subjected to a partial decoking step in the presence of air. Specifically, a large muffle furnace was employed wherein the temperature was increased from 300° to 600° F. at 100° F. per hour increments and then held at 600° F. for 1 hour. This partial decoking step removed about 50 percent of the deposited coke and increased the pore volume from about 0.1 to about 0.4 cc/g. The partially decoked catalyst was then impregnated with an aqueous solution of ammonium heptamolybdate to achieve about 3.5 wt.% additional MoO₃ loading on the catalyst, based on fresh catalyst weight. The subject catalyst was then dried overnight in an air-purged convection oven. A final decoking or coke-burning step was carried out in the presence of air at 900° F. for about 2 hours after carrying out a temperature increase procedure from 300° to 900° F. wherein the temperature was increased approximately 100° F. per hour.

TABLE I

| Catalyst | "A" Fresh HDM Control | "B" Fresh HDS | "C" Equilibrium HDS Spent | "D" Regenerated HDS Invention |
|---|---|---|---|---|
| Chemical Analyses (wt %, Fresh Basis, Al-Tie) | | | | |
| Ni | — | — | 1.64 | 1.95 |
| V | — | — | 6.09 | 5.53 |
| Fe | — | — | 1.15 | 1.06 |
| Na | 0.031 | — | 0.26 | 0.20 |
| Si | 1.01 | — | 0.21 | 0.29 |
| CoO | 0.55 | 3.74 | 3.51 | 4.11 |
| MoO₃ | 3.81 | 15.0 | 15.4 | 18.8 |
| C | — | — | 54.10 | 0.00 |
| H | — | — | 2.51 | 0.92 |
| S | 0.12 | — | 8.02 | 1.50 |
| Al (Fresh Basis) | (58.0) | (43.6) | (43.6) | (43.6) |
| Al (Decoked Basis) | — | — | — | 26.4 |
| Al (Spent Basis) | — | — | 25.0 | — |
| Physical Inspections (Fresh Basis, Al-Tie Point) | | | | |
| N₂ Desorption | | | | |
| BET, m²/g | 194 | 326 | 18.5 | 285 |
| BJH, 1200 Å−, cc/g | 0.80 | 0.83[(1)] | 0.073 | 0.72 |
| Hg Porosimetry PV, 1200 Å+, cc/g | 0.24 | 0.24 | 0.21 | 0.37 |

[(1)]2500 style N₂ desorption

Activity testing was carried out in a two-stage fixed-bed upflow reactor at conditions including 790° F., 0.6 LHSV, 9000 SCFB hydrogen circulation rate, and 2,000 psig total pressure. For both the fresh catalyst run and the invention run, the first upstream reactor contained 13 cc of catalyst and the second downstream reactor contained 7 cc of catalyst. The reactor catalyst loadings were also diluted with 13 and 7 cc of alundum, respectively, in order to achieve an appropriate "thermal-to-catalytic" ratio.

The thermal-to-catalytic ratio of the two-reactor system was approximately one. The thermal-to-catalytic ratio is calculated for a particular reactor as the following quotient. In particular, the numerator is the total internal volume in the thermal zone of a reactor minus the settled volume of the catalyst charge (i.e., catalyst plus diluent) plus the interstitial liquid volume between particles in the catalyst charge present in the reactor plus the liquid volume in the catalyst pores. The denominator is the settled volume of the catalyst itself in the catalyst charge.

The feedstock used in each test was a vacuum resid whose properties are set out below in Table II.

TABLE II

| FEED INSPECTION | |
|---|---|
| Total Liquid | |
| Gravity, °API | 7.7 |
| 1000° F.+, wt % | 65.2 |
| Ni, ppm | 40 |
| V, ppm | 170 |
| Fe, ppm | 4 |
| S, wt % | 2.68 |

TABLE II-continued

| FEED INSPECTION | |
|---|---|
| Total Liquid | |
| N, wt % | 0.449 |
| O, wt % | 0.61 |
| C, wt % | 83.91 |
| H, wt % | 10.26 |
| Ramscarbon, wt % | 13.3 |
| NMR-$C_A$, atom % | 30.6 |
| 1000° F.+ | |
| Oils, wt % | 22.0 |
| Resins, wt % | 66.4 |
| Asphaltenes, wt % | 11.6 |

Figure 2:
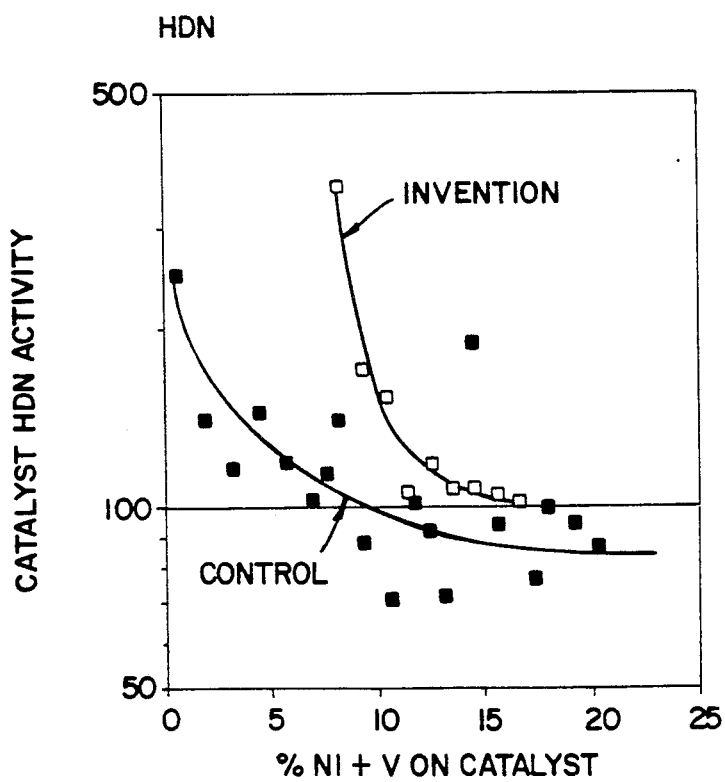
Figure 3:
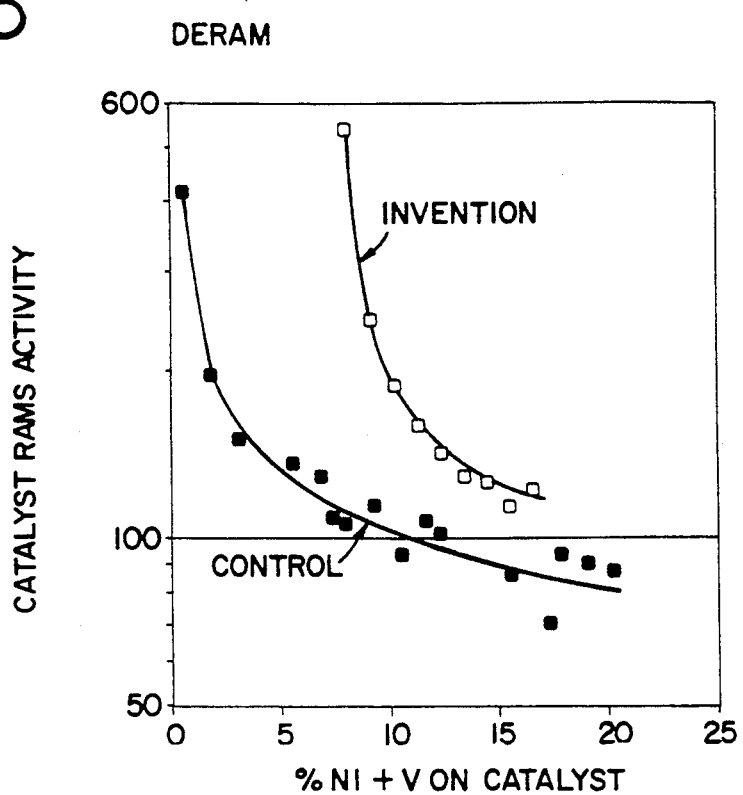
Figure 4:
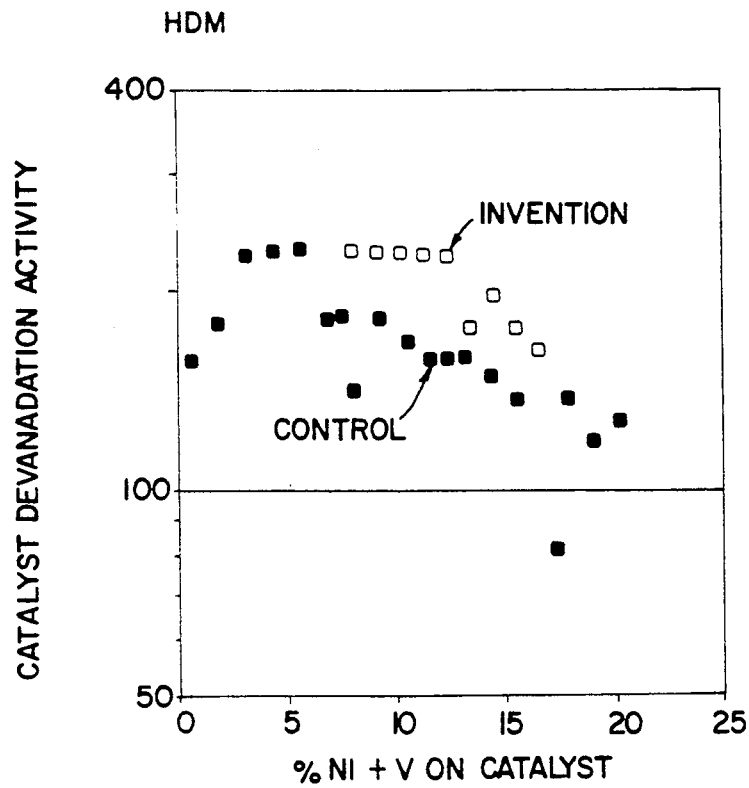

FIGS. 1 through 4 depict desulfurization activity, hydrodenitrogenation activity, Ramscarbon removal activity, and devanadation activity, respectively, versus weight percentage accumulation of nickel plus vanadium upon the catalyst for both of the tested catalysts. These figures contain the activity data measured in connection with the testing of the respective catalysts as described above.

Denitrogenation activity was calculated assuming pseudo-first-order kinetics with an activation energy of 45,400 Btu/lb-mol in accordance with the following equation:

$$A_N = \frac{\left[\ln\left(\frac{N_P \times .93}{N_F}\right)\right] \times LHSV}{K_N \times P \times e^{-E/RT}}$$

ps where:
$A_N$ is HDN activity
$N_F$ is feed nitrogen content, ppm
$N_P$ is product nitrogen content, ppm
LHSV is liquid (volumetric) hourly space velocity, hr$^{-1}$
$K_N$ is pre-exponential feed nitrogen factor = 82 hr$^{-1}$ psig$^{-1}$
P is total pressure, psig
E is activation energy 45,400 Btu/lb-mol
T is absolute average temperature, °R, Devanadation activity was calculated on the basis of the following first-order rate equation, where the activation energy was 83,300 Btu/lb-mol:

$$A_v = \frac{\left[\ln\left(\frac{V_P \times .93}{V_F}\right)\right] \times LHSV}{K_V \times P \times e^{-E/RT}}$$

where
$A_v$ is devanadation activity
$V_P$ is product vanadium content, ppm
$V_F$ is feed vanadium content, ppm
$K_v$ is pre-exponential feed vanadium factor (2520×10⁶ hr$^{-1}$ psig$^{-1}$)
P is total pressure, psig
T is absolute average temperature, °R,
E is activation energy, 83,300 Btu/lb-mol
LHSV is liquid (volumetric) hourly space velocity, hr$^{-1}$ Desulfurization activity assuming pseudo-second order with an activation energy of 83,300 BTU/lb-mol was calculated in accordance with the following equation:

$$A_s = \frac{\left(\frac{1}{S_P \times .93} - \frac{1}{S_F}\right) \times LHSV}{k_s \times P \times e^{-E/RT}}$$

where:
$A_s$ is desulfurization activity
$k_s$ is pre-exponential feed sulfur factor ($2085 \times 10^6$ hr$^{-1}$ psig$^{-1}$/wt%)
SP ls product sulfur content, wt%
P is total pressure, psig
$S_F$ is feed sulfur content, wt%
T is absolute average temperature, ° R.,
E is activation energy, 83,300 Btu/lb-mol LHSV is liquid (volumetric) hourly space velocity, hr$^{-1}$ Ramscarbon removal activity assuming pseudo-second-order kinetics with an activation energy of 83,300 BTU/lb-mol was calculated in accordance with the following equation:

$$A_r = \frac{\left(\frac{1}{R_P \times .93} - \frac{1}{R_F}\right) \times LHSV}{k_r \times P \times e^{-E/RT}}$$

where
$A_r$ is ramscarbon removal activity
$k_r$ is pre-exponential feed ramscarbon factor ($130 \times 10^6$ hr$^{-1}$ psig$^{-1}$/wt%)
$R_P$ is product ramscarbon content, wt%
$R_F$ is feed ramscarbon content, wt%
P is total pressure, psig
T is absolute average temperature, °R,
E is activation energy, 83,300 Btu/lb-mol
LHSV is liquid (volumetric) hourly space velocity, hr$^{-1}$ FIGS. 1 through 4 clearly show that all of the initial activities of the invention regenerated HDS catalyst are equal to or exceed the fresh HDM catalyst activities. Further, the deactivation rates were also similar for the invention and fresh catalysts.

EXAMPLE 2

The present example serves to show the improvement afforded by the invention regeneration process with respect to attrition resistance. A spent catalyst whose properties are set out above in Table I was regenerated in accordance with the invention. The subject catalyst was partially decoked at 600° F., followed by impregnation with an aqueous solution of ammonium heptamolybdate in an amount sufficient to yield about 3.5 wt.% additional MoO$_3$ loading on the catalyst, calculated on a fresh catalyst basis. The catalyst was then fully decoked at 900° F. using the same procedure described in Example 1.

A comparative regenerated catalyst was prepared by decoking the spent catalyst described in Example 1 in the presence of air at 900° F. for 2 hours.

Each catalyst sample was passed over a U.S. 30 mesh size sieve to remove fines. Subsequently, the sample was calcined for 1 hour at 900° F. in a nitrogen purged oven at 6.8 SCFH using a wire mesh basket. The sample was then cooled to room temperature in a desiccator. Each sample weight, W(b), was then recorded. Each sample was then placed in an abrasion test drum as described in ASTM method D4058. Also loaded into the drum was a 1 ml. vial of Darco G-60 activated carbon powder (100-325 mesh) to control any static electricity charge build-up.

Prior to loading, the activated carbon was dried in nitrogen (0.34 SCFH) at 750° F. for 1 hour. The total weight of added carbon was about 0.4 to about 0.5 g. The drum was then rotated at 60 rpm for 22 hours. After rotation, each sample was screened over a 30 mesh sieve. The screened sample was then put into an air-purged oven at 600° F. The temperature was then increased to 900° F. and then held there for at least 1 hour. The oven was then cooled to 800° F. and the sample was then placed in an empty desiccator to cool. Each sample was then weighed, and the weight W(a) recorded.

The loss on attrition (LOA) was then calculated for each sample in accordance with the following formula:

$$LOA = \frac{[W(b) - W(a)]}{W(b)} \times 100$$

An acceptable loss on attrition rate is less than about 3.0 wt.%/day and most preferably less than about 2.5 wt.%/day. The invention regenerated catalyst achieved a dry loss on attrition of 2.55 wt.%/day, well below the acceptable rate of 3.0 wt.%/day. Several attrition tests carried out upon the comparative regenerated catalysts yielded dry loss on attrition values of 4.50, 4.92, 4.41, 6.14 wt.%/day.

What is claimed is:

1. A process for regenerating a metals contaminated heavy hydrocarbon hydroprocessing catalyst with a total contaminant metals buildup of greater than about 4 wt.% nickel plus vanadium based on the total weight of fresh catalyst wherein said spent catalyst prior to being deactivated by contact with a hydrocarbon stream possessed at least 0.05 cc/g pore volume in pores having pore diameters greater than about 1200 Angstroms consisting essentially of the steps:
   a) partially decoking said catalyst in an initial coke-burning step wherein said catalyst is contacted with an oxygen-containing gas at a temperature ranging from about 400° F. to about 700° F.;
   b) incorporating at least one Group VIB metal with said partially decoked catalyst, such that said partially decoked catalyst contains from about 0.1 to about 20.0 wt.% of said Group VIB metal calculated as the oxide and based on the fresh weight of said spent catalyst; and
   c) decoking said Group VIB metal-containing catalyst in a final coke-burning step wherein said Group VIB metal-containing catalyst is contacted with an oxygen-containing gas at a temperature of about 600° F. to about 1400° F.

2. The process of claim 1 wherein said final coke-burning step is carried out at a temperature ranging from about 600° F. to about 1200° F.

3. The process of claim 1 wherein said final coke-burning step is carried out at a temperature ranging from about 600° F. to about 1000° F.

4. The process of claim 1 wherein said Group VIB metal is molybdenum.

5. The process of claim 1 wherein said partially decoked catalyst contains about 0.5 to about 10.0 wt.% of said Group VIB metal.

6. The process of claim 1 wherein said partially decoked catalyst contains about 1.0 to about 5.0 wt.% of said Group VIB metal.

7. The process of claim 1 wherein said initial coke-burning step is carried out until up to about 70 wt.% of the coke present in said spent catalyst is removed.

8. The process of claim 1 wherein said spent catalyst prior to being deactivated by contact with a hydrocarbon stream possessed at least 0.1 cc/g pore volume in pores having pore diameters greater than about 1200 Angstroms.

9. The process of claim 1 wherein said spent catalyst prior to being deactivated by contact with a hydrocarbon stream possessed a pore volume of about 0.15 to about 0.3 cc/g in pores having a diameter greater than about 1200 Angstroms.

* * * * *